United States Patent
Ito et al.

(10) Patent No.: US 8,306,805 B2
(45) Date of Patent: Nov. 6, 2012

(54) SCENARIO GENERATION METHOD AND SCENARIO GENERATION APPARATUS

(75) Inventors: Masayuki Ito, Yokohama (JP); Tooru Higeta, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 11/512,264

(22) Filed: Aug. 30, 2006

(65) Prior Publication Data

US 2007/0233453 A1  Oct. 4, 2007

(30) Foreign Application Priority Data

Mar. 28, 2006 (JP) ................. 2006-088316

(51) Int. Cl.
*G06F 9/45* (2006.01)
(52) U.S. Cl. ......................................... 703/22
(58) Field of Classification Search ...... 703/22
See application file for complete search history.

(56) References Cited

U.S. PATENT DOCUMENTS

| | | | | |
|---|---|---|---|---|
| 5,974,572 | A | * | 10/1999 | Weinberg et al. ............... 714/47 |
| 6,697,964 | B1 | * | 2/2004 | Dodrill et al. ................... 714/38 |
| 2003/0005044 | A1 | * | 1/2003 | Miller et al. .................. 709/203 |

FOREIGN PATENT DOCUMENTS

| | | |
|---|---|---|
| JP | 2003-44318 | 2/2003 |
| JP | 2003-530625 | 10/2003 |
| JP | 2005-70835 | 3/2005 |
| JP | 2005-250945 | 9/2005 |
| WO | WO 01/35222 A2 | 5/2001 |

* cited by examiner

*Primary Examiner* — David Silver
(74) *Attorney, Agent, or Firm* — Staas & Halsey LLP

(57) ABSTRACT

Disclosed is a scenario generation program that is used to generate a scenario given to a plurality of virtual web clients each of which applies access load to a web server device of a test target. According to the program, a computer stores some first request messages transmitted to a web server device and some second request messages transmitted to the web server device based on the same operation. The computer extracts the differences between the request parameters in the first and second request messages in the same order of the same operation. If page data of a response message includes the extracted request parameters, rewriting-item information is generated corresponding to the request parameter and is incorporated into the scenario. The computer replace the parameter shown by the rewriting-item information whenever the computer executes the scenario.

2 Claims, 5 Drawing Sheets

Fig. 3

31:Comparison table

Figure 1:
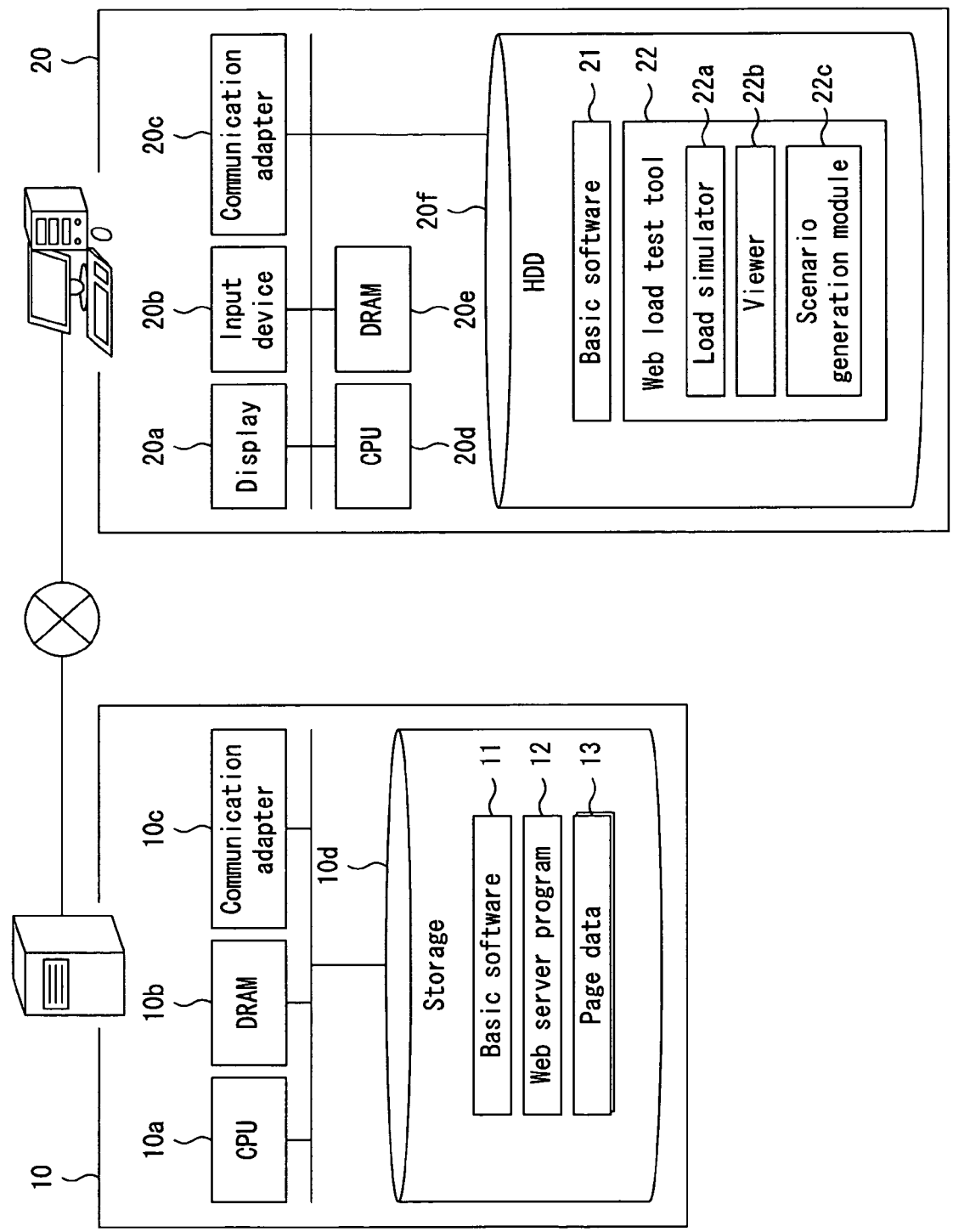

| Order | Variable name | Value 1 | Value 2 | Source |
|---|---|---|---|---|
| 18 | pageId | 2096 | 1024 | 16 |
| 25 | uId | 6 | 7 | 5 |
| ⋮ | ⋮ | ⋮ | ⋮ | ⋮ |

Fig. 4

First provisional scenario  URL10: http://localhost/sample.jsp?id=0001&passwd=0001&pageId=4532
Second provisional scenario URL10: http://localhost/sample.jsp?id=0001&passwd=0001&pageId=1867

Fig.5

```
~
<form action=" ./sample.jsp"  method=" POST" >
  <input type=" text"  name=" id" >
  <input type=" password"  name=" passwd" >
  <input type=" hidden"  name=" pageId"  value=" 4532" >
</form>
~
```

SCENARIO GENERATION METHOD AND SCENARIO GENERATION APPARATUS

BACKGROUND OF THE INVENTION

The present invention relates to a scenario generation program for generating a scenario used in a load simulator.

A web load testing apparatus includes a load simulator and a viewer to observe a state of a web server device as a test target while applying a load thereto. The load simulator generates a plurality of threads that function as virtual web clients; gives scenarios, each of which defines the request order for page data in the web server device as a test target, to the generated virtual web clients; and makes the clients transmit request messages and receive response messages as defined in the scenario. Thereby, the load simulator saves the response messages that are received by the virtual web clients from the web server device, and records a log of the responses. The viewer displays a web page based on the page data in the response messages, or displays a list of the log information about the responses.

The scenario mentioned above is generated based on request history of web pages displayed in order by actually accessing the web server device of the test target before a web load test. Specifically, a scenario is data that defines some request messages and the transmission order thereof. Some request messages contained in a scenario include arguments that should be passed to the web server device by a get method or a post method.

However, these arguments may be inappropriate when applying access load to a web server device even if they are appropriate when generating a scenario. For example, in a case where the argument is time information, even if the time information is passed to the web server device when applying access load, the virtual web client may not receive an appropriate response message when the web server device determines that a timeout occurs.

The following publications indicate a pertinent art.

International publication WO 01/035222 discloses a system and method for replaying a predefined path through the internet. The method includes selecting a saved request associated with a saved URL from a request history. If the saved request is a form request, the method can determine a best-fit form from the originating web page for which a replay request can be made. Alternatively, if the request is not a form request, the method selects a best-fit URL on the originating web page for which a replay request can be made. After a best-fit form or a best-fit URL is selected as a target URL, the method makes a replay request to the target URL.

Japanese-unexamined patent publication JP2005-250945A discloses a web application inspection device that inspects a security hole in a web application. An inspection means of the inspection device generates an inspection request that includes input parameters described by macro to be used for input to a web application.

When an inspection request is transmitted to a Web server of a test target, a macro execution means executes a macro and replaces input parameters by predetermined values. A web accessing means transmits the inspection request described by macro to a web server to inspect an application on the web server.

SUMMARY OF THE INVENTION

An object of the present invention is to provide a program for generating a scenario that makes a virtual web client transmit a request message and receive a response message appropriately when applying access load on a web server device of a test target.

A scenario generation program of a present invention is used to generate a scenario given to a plurality of virtual web clients each of which applies access load to a web server device of a test target. The program makes a computer function as means including: a first memory means for storing some first request messages that are transmitted to a web server device in order based on a predetermined operation and some response messages that are received in order, into storage; a second memory means for storing some second request messages transmitted to the web server device in order based on the same operation as the above; an extraction means for extracting the differences between the request parameters in the first and second request messages that are stored in the storage by the first and second memory means in the same order of the same operation; a retrieval means for retrieving a response message whose page data includes the request parameters that are extracted by the extraction means as different parts from data in the storage; an information generation means for generating rewriting-item information when the retrieval means retrieves the response message, wherein the rewriting-item information shows that the request parameters extracted by the extraction means as different parts are necessary to be rewritten when applying access load; and an output means for outputting a scenario that includes all the first request messages in the storage and the rewriting-item information that is generated by the information generation means.

With the above program, the first request messages, which are transmitted to the web server device based on the predetermined operation, are stored, and the second request messages, which are transmitted to the web server device based on the same operation, are also stored. Regarding the first and second request messages of the same order in the operation, if there are request messages whose request parameters are different to each other and the request parameters are included in the response message that is acquired before the request messages are transmitted, it is judged that the request parameters in the request messages should be rewritten appropriately every time the virtual web client executes the scenario in an access load test, and such information is incorporated into the scenario as the rewriting-item information. Therefore, the virtual web client can appropriately change the request parameters that should be changed appropriately using the rewriting-item information incorporated in the scenario when executing access load test.

According to the present invention, a scenario, which makes a virtual web client transmit a request message and receive a response message appropriately when applying access load on a web server device of a test target, can be generated.

DESCRIPTION OF THE ACCOMPANYING DRAWINGS

Figure 2:
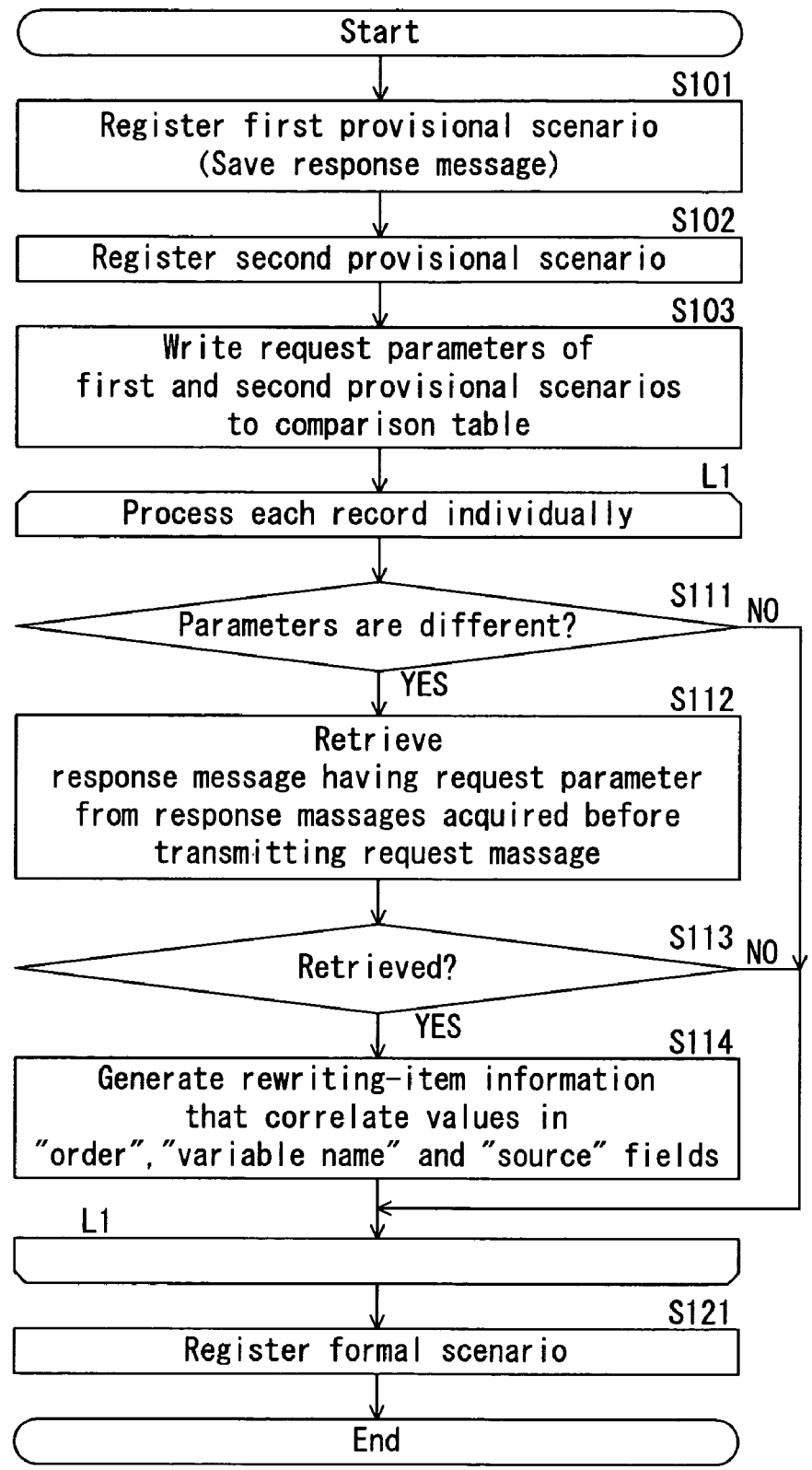

FIG. 1 is a block diagram showing a web server device that is a target of the web load test and a web load testing apparatus that executes the test according to an embodiment of the present invention, FIG. 2 is a flow chart showing a process executed by a CPU in accordance with a scenario generation module, FIG. 3 shows an example of data structure of a comparison table, FIG. 4 shows an example of request parameters of the first and second provisional scenarios, and FIG. 5 shows an example of page data containing the request parameter of FIG. 4.

DESCRIPTION OF THE PREFERRED EMBODIMENTS

There will now be described an embodiment of the present invention with reference to the accompanying drawings.

FIG. 1 is a block diagram showing a web server device 10 that is a target of a web load test and a web load testing apparatus 20 that executes the test according to the embodiment of the present invention.

The web server device 10 is a general purpose computer in which programs for implementing a web server function are installed. The computer that constitutes the web server device 10 contains hardware, such as a CPU (Central Processing Unit) 10a, a DRAM (Dynamic Random Access Memory) 10b, a communication adapter 10c, and storage 10d.

The basic software 11, which provides fundamental functions to many pieces of application software, is installed in the storage 10d. For example, the fundamental functions include management of input/output data via the communication adapter 10c, management of memory areas of the DRAM 10b and the storage 10d, and the like.

The storage 10d also stores a web server program 12 and page data 13 that makes a general purpose computer operate as a web server device. Receiving a request from a web client device (not shown), the web server program 12 reads a requested page data from the inner storage or generates a requested page data, and transmits it to the web client device as a source of request through the communication adapter 10c. The page data 13 is HTML (Hyper Text Markup Language) source data for displaying a web page. This page data 13 may include the information that displays a link for jumping to another web page.

The web load testing apparatus 20 is a device for executing a web load test for the web server device 10 of a test target. This web load testing apparatus 20 is a general personal computer in which the program for implementing a web load test tool function has been installed. The personal computer that constitutes the web load testing apparatus 20 is provided with a display 20a such as a liquid crystal display, input devices 20b such as a keyboard and a mouse, and a main unit that is connected to these devices 20a and 20b. The main unit contains hardware such as a communication adapter 20c, a CPU 20d, a DRAM 20e and storage 20f. The storage 20f stores basic software 21.

The web load testing apparatus 20 stores a web load test tool (program) 22 that makes a personal computer operate as the web load testing apparatus. The web load test tool 22 includes modular programs (components) of a load simulator 22a, a viewer 22b and a scenario generation module 22c.

The load simulator 22a applies access load onto the web server device of a test target. Specifically, the load simulator 22a generates a plurality of threads that function as virtual web clients. Then the load simulator 22a gives a scenario, which defines request order of page data in the web server device of the test target, to the virtual web clients so that the virtual web clients executes the requests according to the scenario. As a result, the load simulator 22a saves response messages that are received by the respective virtual web clients from the web server device and records a log of the responses.

The viewer 22b displays a web page based on the page data in the response message and lists the log information of the responses.

The scenario generation module 22c is a module for generating a scenario that is given to the virtual web clients by the load simulator 22a.

Next, the process executed by the CPU 20d according to the scenario generation module 22c in the embodiment will be described.

FIG. 2 is a flowchart showing the process that is executed by the CPU 20d according to the scenario generation module 22c.

In the first step S101 after the start of process, the CPU 20d executes a process to register the first provisional scenario. A provisional scenario is generated based on request history of web pages displayed in order by actually accessing the web server device 10 of the test target before a web load test. Specifically, a provisional scenario is data that defines some request messages and transmission order thereof. Some request messages contained in a provisional scenario include request parameters that should be passed to the web server device 10 by a get method or a post method. In this Step S101, the CPU 20d saves response messages that are received from the web server device 10 as responses to the request messages.

The CPU 20d that executes the process in step S101 corresponds to the first memory means mentioned above.

In the next step S102, the CPU 20d registers the second provisional scenario. The second provisional scenario registered at the step S102 is generated based on the history acquired when the same request destination is accessed in the same order as the first provisional scenario. Therefore, the request destination of each of the request messages that constitute the second provisional scenario is the same as that of the first provisional scenario.

The CPU 20d that executes the process in step S102 corresponds to the second memory means mentioned above.

In the next step S103, the CPU 20d writes the request parameters included in the request messages that constitute the first and second provisional scenarios to a comparison table. The request parameter in the request message according to the get method is added to URL in the request message. On the other hand, the request parameter in the request message according to the post method is included in the data section of the request message.

FIG. 3 shows an example of the data structure of the comparison table 31. As shown in FIG. 3, the comparison table 31 has records as many as the request parameters in the scenario. Each record has the fields of an "order", a "variable name", a "value 1", a "value 2" and a "source." The number that shows the order of the request message containing the request parameter is recorded on the "order" field. A name attribute value of the request parameter is recorded on the "variable name" field. A value attribute value of the request parameter of the first provisional scenario is recorded on the "value 1" field. A value attribute value of the request parameter of the second provisional scenario is recorded on the "value 2" field. The number showing the order of the request message, which was a trigger to receive the response message containing the page data into which the name attribute value and the value attribute value were embedded (referred to as a source request message, hereafter), in the first provisional scenario is recorded on the "source" field.

When the comparison table 31 is generated in step S013, the "source" field is blank.

The CPU 20d executes the first process loop L1 after generating the comparison table 31 as shown in FIG. 3.

In the first process loop L1, the CPU 20d executes steps S111 through S114 in order for each record in the comparison table 31.

In step S111, the CPU 20d judges whether the value in the "value 1" field and the value in the "value 2" field of the process target record are identical or not.

The CPU 20d that executes the process in step S111 corresponds to the extraction means mentioned above.

If the values in the "value 1" and "value 2" fields of the process target record are different to each other, the CPU 20d branches the process to step S112.

In step S112, the CPU 20d distinguishes the response messages obtained in response to the transmission of the request messages whose orders are prior to the value in the "order" field of the process target record from the other response messages recorded in step S101, and then, the CPU 20d retrieves the response message that has the value (the value attribute value) in the "value 1" field from the distinguished response messages.

The CPU 20d that executes the process in step S112 corresponds to the retrieval means mentioned above.

In the next step S113, the CPU 20d judges whether the response message having the value (the value attribute value) in the "value 1" field of the process target record is retrieved or not.

When the response message having the value (the value attribute value) in the "value 1" field of the process target record is retrieved, the CPU 20d branches the process from step S113 to step S114.

In step S114, the CPU 20d stores the order of the request message, which was a trigger to receive the retrieved response message, in the first provisional scenario into the "source" field of the process target record. Subsequently, the CPU 20d generates rewriting-item information that correlates the value (the order number) in the "order" field, the value (the name attribute value) in the "variable name" field, and the value (the order number) in the "source" field of the process target record.

The CPU 20d that executes the process in step S114 corresponds to the information generation means mentioned above.

On the other hand, if the value in the "value 1" and the value in the "value 2" field of the process target record were judged to be identical in step S111, or if the response message having the value (the value attribute value) in the "value 1" field of the process target record was not retrieved in S113, the CPU 20d finishes the process without generating the rewriting-item information for the process target record.

After finishing the processes from step S111 to S113 for all the record in the comparison table 31, the CPU 20d leaves the first process loop L1 and proceeds the process to step S121.

In step S121, the CPU 20d registers a formal scenario by combining the first provisional scenario registered in step S101 and the rewriting-item information generated in step 114. And after registering, the CPU 20d finishes the process shown in FIG. 2.

The CPU 20d that executes the process in step S121 corresponds to the output means mentioned above.

Next, operations and effects of the scenario generation module 22c of the embodiment will be described.

When a user starts the scenario generation module 22c, the scenario generation module 22c requires to generate a provisional scenario (step S101). The user repeats page transition operation. That is, the user accesses the web page presented by the web server device 10, clicks a link in the web page and inputs predetermined information according to the predetermined operating procedure. Then, when the user input the predetermined registration instruction, the request messages during the page transition operation are saved as the first provisional scenario, and the response massages are saved (step S101).

Subsequently, since the user is required to generate provisional scenario again, he or she repeats the page transition operation according to the same operating procedure. Then, the request messages during the page transition operation are saved as the second provisional scenario (step S102).

After two provisional scenarios are generated, the scenario generation module 22c generates a formal scenario based on them (steps S111-S114, S121).

When generating a formal scenario, the request parameters of the request message in the first provisional scenario is compared to the request parameters of the request message in the second provisional scenario for the same operation in the same order. As shown in FIG. 4, when the value attribute value (pageId=4532) of the request parameter added to URL in the first provisional scenario is different from the value attribute value (pageId=1867) in the second provisional scenario, for example, it is judged that the request parameter should be rewritten appropriately every time the virtual web client executes the scenario in the access load test. Therefore, the module searches a response message having the request parameter (pageId=4532) in the first provisional scenario from the response messages that are acquired before the request message is transmitted (step S112). As shown in FIG. 5, when the request parameter (pageID=4532) is found in the page data in the response message (step S113; YES), the request parameter is determined as an item whose value attribute value should be rewritten every time the scenario is executed. Then, rewriting-item information in response to the request parameter is generated and it is incorporated to the scenario (step S114).

When a virtual web client applies access load on the web server device 10 using the scenario generated in this manner, the virtual web client repeats transmission of request messages and reception of response messages. When the virtual web client transmits the source request messages shown by the number within rewriting-item information required during repeating transmission and reception, the virtual web client retrieves the name attribute value in the rewriting-item information from the page data of the response message thereof and reads the value attribute value corresponding to the name attribute value. Then, when the virtual web client transmits the request message shown by the number in the rewriting-item information, the virtual web client replaces the value attribute value corresponding to the name attribute value in the request message with the value attribute value that is read in advance before transmitting the request message.

As described above, since the rewriting-item information is incorporated in the scenario, access load can be applied normally even if a request message in the scenario contains a request parameter that should be changed appropriately whenever a virtual web client executes the scenario.

What is claimed is:

1. A scenario generation method generating a scenario given to a plurality of virtual web clients each of which applies access load by request messages to a web server device of a test target, said method comprising:
   storing first provisional scenario, the first provisional scenario being data that defines request messages and transmission order of the request messages, at least one of the request messages including request parameters that is passed to the web server device by one of a get method and a post method;

storing response messages that are received from the web server device as responses to the request messages of the first provisional scenario;

registering second provisional scenario, each of the request messages included in the second provisional scenario being the same as that of the first provisional scenario;

comparing the request parameters of a request message of the request messages in the first provisional scenario to the request parameters of a request message of the request messages in the second provisional scenario at the same order in each of the request massages in the first provisional scenario and the request massages in the second provisional scenario;

extracting, when the request parameter in the first provisional scenario is different from the request parameter in the second provisional scenario, response messages acquired before acquiring the request message including the request parameter in the first provisional scenario;

identifying from the extracted response messages a response message having a value associated with the request parameter of the first provisional scenario;

determining, when the request parameter in the first provisional scenario is different from the request parameter in the second provisional scenario, that the request message of first provisional scenario including the request parameter is a rewriting target request message; and associating, when the request parameter in the first provisional scenario is different from the request parameter in the second provisional scenario, the rewriting target request message with the request message associated with the request parameter found in page data of the identified response message; and outputting the scenario to rewrite a request parameter in the rewriting target request message based on the request parameter of the identified response message when transmitting the rewriting target request message.

2. A scenario generation apparatus for generating a scenario given to a plurality of virtual web clients each of which applies access load by request messages to a web server device of a test target, said apparatus comprising:

a first storing unit to store first provisional scenario, the first provisional scenario being data that defines request messages and transmission order of the request messages, at least one of the request messages including request parameters that is passed to the web server device by one of a get method and a post method;

a second storing unit to store response messages that are received from the web server device as responses to the request messages of the first provisional scenario;

a registering unit to register second provisional scenario, each of the request messages included in the second provisional scenario being the same as that of the first provisional scenario;

a comparing unit to compare the request parameters of a request message of the request messages in the first provisional scenario to the request parameters of a request message of the request messages in the second provisional scenario at the same order in each of the request massages in the first provisional scenario and the request massages in the second provisional scenario;

an extracting unit to extract, when the request parameter in the first provisional scenario is different from the request parameter in the second provisional scenario, response messages acquired before acquiring the request message including the request parameter in the first provisional scenario;

an identifying unit to identify from the extracted response messages a response message having a value associated with the request parameter of the first provisional scenario;

a determining unit to determine, when the request parameter in the first provisional scenario is different from the request parameter in the second provisional scenario, that the request message of first provisional scenario including the request parameter is a rewriting target request message;

an associating unit to associate, when the request parameter in the first provisional scenario is different from the request parameter in the second provisional scenario, the rewriting target request message with the request message associated with the request parameter found in page data of the identified response message; and an outputting unit to output the scenario to rewrite a request parameter in the rewriting target request message based on the request parameter of the identified response message when transmitting the rewriting target request message.

* * * * *